United States Patent [19]
Doomen et al.

[11] Patent Number: 5,859,135
[45] Date of Patent: Jan. 12, 1999

[54] AQUEOUS COATING COMPOSITIONS COMPRISING FUNCTIONAL GROUP-CONTAINING CROSSLINKABLE RESINS

[75] Inventors: Willy Frans Anna Doomen, Lier, Belgium; Mario Martinus Maria van Wingerde, Roosendaal, Netherlands

[73] Assignee: Akzo Nobel NV, Arnhem, Netherlands

[21] Appl. No.: 48,345

[22] Filed: Apr. 15, 1993

[30] Foreign Application Priority Data

Apr. 16, 1992 [EP] European Pat. Off. .............. 92201094

[51] Int. Cl.⁶ ................................ C08L 75/04; C08F 8/30
[52] U.S. Cl. .................... 525/123; 525/127; 525/131; 525/379; 525/384; 525/386; 525/408; 525/425
[58] Field of Search ..................................... 525/127, 131, 525/408, 425, 379, 384, 386, 123

[56] References Cited

U.S. PATENT DOCUMENTS

| | | | |
|---|---|---|---|
| 2,634,245 | 4/1953 | Arndt | 260/22 |
| 3,291,775 | 12/1966 | Holm | 260/47 |
| 3,379,548 | 4/1968 | Jen | 106/245 |
| 3,945,964 | 3/1976 | Hastings et al. | 260/29.6 |
| 3,979,346 | 9/1976 | Zuckert et al. | 260/23 |
| 4,028,313 | 6/1977 | Muller et al. | 260/77.5 |
| 4,070,259 | 1/1978 | De Poortere | 204/159 |
| 4,116,902 | 9/1978 | Harris et al. | 260/22 |
| 4,131,579 | 12/1978 | Mummenthey et al. | 260/22 |
| 4,133,786 | 1/1979 | Harris et al. | 260/22 |
| 4,145,248 | 3/1979 | Van Eenam | 162/163 |
| 4,163,094 | 7/1979 | Turpin | 528/45 |
| 4,221,685 | 9/1980 | Eschwey et al. | 260/22 |
| 4,233,194 | 11/1980 | Eschwey et al. | 260/22 |
| 4,255,541 | 3/1981 | Simms | 525/437 |
| 4,277,380 | 7/1981 | Williams et al. | 260/18 |
| 4,303,563 | 12/1981 | Emmons et al. | 260/23 |
| 4,303,565 | 12/1981 | Tobias | 260/23 |
| 4,315,044 | 2/1982 | Elmore et al. | 427/386 |
| 4,318,832 | 3/1982 | Zabrocki et al. | 523/402 |
| 4,321,170 | 3/1982 | Zabrocki et al. | 524/263 |
| 4,321,305 | 3/1982 | Castellucci et al. | 428/410 |
| 4,331,573 | 5/1982 | Zabrocki et al. | 524/199 |
| 4,333,865 | 6/1982 | Zuckerts | 523/410 |
| 4,352,898 | 10/1982 | Albers | 523/414 |
| 4,373,008 | 2/1983 | Emmons et al. | 428/413 |
| 4,382,102 | 5/1983 | Noomen | 427/54.1 |
| 4,408,018 | 10/1983 | Bartman et al. | 525/300 |
| 4,414,250 | 11/1983 | Costanza | 427/386 |
| 4,446,258 | 5/1984 | Chu et al. | 523/406 |
| 4,505,986 | 3/1985 | Geerdes et al. | 428/481 |
| 4,538,000 | 8/1985 | Parr | 568/616 |
| 4,585,828 | 4/1986 | Meixner et al. | 524/604 |
| 4,590,101 | 5/1986 | Knapczyk | 427/350 |
| 4,598,108 | 7/1986 | Hoefs | 523/411 |
| 4,602,061 | 7/1986 | Akkerman | 525/10 |
| 4,608,406 | 8/1986 | Williams et al. | 523/424 |
| 4,737,008 | 4/1988 | Ohyama et al. | 350/96.2 |
| 4,737,530 | 4/1988 | Hoefs et al. | 523/414 |
| 4,772,680 | 9/1988 | Noomen et al. | 525/229 |
| 4,871,822 | 10/1989 | Brindopke et al. | 526/271 |
| 4,929,661 | 5/1990 | Noomen et al. | 524/259 |
| 4,981,944 | 1/1991 | Bartels et al. | 528/220 |
| 4,990,577 | 2/1991 | Noomen et al. | 525/454 |
| 5,011,994 | 4/1991 | Bartels et al. | 564/278 |
| 5,021,544 | 6/1991 | Padget et al. | 528/272 |
| 5,071,481 | 12/1991 | Maters et al. | 106/287.2 |
| 5,098,947 | 3/1992 | Metzger et al. | 524/507 |
| 5,098,983 | 3/1992 | Mosbach et al. | 528/59 |

FOREIGN PATENT DOCUMENTS

| | | |
|---|---|---|
| 406023 | 9/1967 | Australia . |
| 8224787 | of 1988 | Australia . |
| 2007097 | 7/1990 | Canada . |
| 0067625 | 12/1982 | European Pat. Off. . |
| 0157291 | 10/1985 | European Pat. Off. . |
| 0234641 | 9/1987 | European Pat. Off. . |
| 262720 | 4/1988 | European Pat. Off. . |
| 0355892 | 2/1990 | European Pat. Off. . |
| 0357110 | 3/1990 | European Pat. Off. . |
| 0401898 | 12/1990 | European Pat. Off. . |
| 0445863 | 9/1991 | European Pat. Off. . |
| 469646 | 2/1992 | European Pat. Off. . |
| 0510438 | 10/1992 | European Pat. Off. . |
| 2455896 | 11/1974 | Germany . |
| 1117126 | 6/1968 | United Kingdom . |
| 1199810 | 7/1970 | United Kingdom . |
| 1517767 | 7/1978 | United Kingdom . |
| 2100271 | 12/1982 | United Kingdom . |
| 2112793 | 7/1983 | United Kingdom . |
| 8300151 | 1/1983 | WIPO . |
| 8400160 | 1/1984 | WIPO . |

OTHER PUBLICATIONS

JP–A–01146968; English abstract only.
JP–A–2053880; English abstract only.
"Further Polymers Derived from Bisazlactones and Tetraamino Compounds", *Journal of Polymer Science: Part A: Polymwer Chemistry*, vol. 27, pp. 1515–1524 (1989), Katritzky, et al.
"Novel Storage Stable, Low Temperature Curable Coating Compositions", *ACS Pol. Mat. Sci. Eng.*, vol. 63, pp. 936–940 (1990).

*Primary Examiner*—Fred Zitomer
*Attorney, Agent, or Firm*—James K. Poole; Loretta A. Miraglia

[57] ABSTRACT

The present invention relates generally to aqueous coating compositions comprising a resin component including a functional group-containing crosslinkable resin and, optionally, a curing/crosslinking agent for functional groups of the crosslinkable resin. More specifically, the resin component includes, at least in part, a special anionically or anionically/non-ionically stabilized functional group-containing crosslinkable resin which can function as either the primary crosslinkable resin (self-emulsifying system) or as a reactive emulsifier for other lipophilic crosslinkable resins (stabilized system).

11 Claims, No Drawings

AQUEOUS COATING COMPOSITIONS COMPRISING FUNCTIONAL GROUP-CONTAINING CROSSLINKABLE RESINS

BACKGROUND OF THE INVENTION

1. Field of the Invention

The present invention relates generally to aqueous coating compositions comprising functional group-containing crosslinkable resins (the "resin component") and, optionally, a curing/crosslinking agent for functional groups of the crosslinkable resin.

2. Background

Most successful coating compositions, particularly those suited for use in the automotive industry, have been based upon generally lipophilic crosslinkable binder resins diluted in organic solvents. Increasingly stringent health/safety and environmental legislation, however, is making the use of organic solvents an expensive and unfashionable option for the coatings industry. As such, the industry is intensively seeking waterborne alternatives to their long-standing and commercially successful organic solvent based products; however, it has been difficult at best to make the switch to water without significant loss of coating stability and/or resulting film quality.

One option pursued has been to render the lipophilic resins water-dilutable (so called "self-emulsifying" resins). This can and has been done, for example, by building hydrophilic functionality into a polymer backbone or by providing the polymer with a structure wherein the hydrophilic functionality is made pendant to such polymeric backbone. See, for example, U.S. Pat. Nos. 2,634,245, 3,379,548, 4,116,902, 4,133,786, 4,028,313, 4,255,541, 4,277,380, 4,303,565, 4,315,044, 4,321,305, 4,333,865, 4,585,828, 4,608,406 and 5,021,544, British Patents GB 1 117 126, GB 1 199 810, GB 1 517 767 and WO 83/00151, EP-A-157291, EP-A-0355892, EP-A-0445863 and EP-A-0469646. The results obtained with this option, however, are not always satisfactory because the resins often possess a relatively large number of hydrophilic groups, tending to render the resulting films somewhat water-sensitive.

Another option has been to disperse such lipophilic resins in water with the aid of separate dispersing agents. For example, U.S. Pat. Nos. 4,352,898; 4,598,108; 4,737,530; 4,929,661; and EP-A-0262720 disclose the use of relatively low molecular weight organic compounds as dispersing agents. The aqueous coatings described, while satisfactory in many respects, may still require the use of significant amounts of organic co-solvents. Additionally, the described dispersants may evaporate and contribute to the overall volatile organic compounds (VOC), and what dispersant remains in the resulting film tends to act as an undesirable hydrophilic center.

Relatively higher molecular weight surfactants have also been used. For example, U.S. Pat. Nos. 3,945,964, 4,318,832 and WO84/00169 describe the use of various non-ionic (e.g., polyoxyalkylene) and anionic surfactants. The described surfactants, however, are generally non-reactive and, while solving certain disadvantages of the lower molecular weight organic compounds, have a stronger tendency than the lower molecular weight counterparts to remain as undesirable hydrophilic centers in the resulting films.

In still further attempts to overcome the problems associated with the above-referenced systems, it has been proposed to use surfactants which become bound into the film structure during the crosslinking reaction. Such "reactive emulsifiers" have been described, for example, in Australian Patent No. AU-A-82247/87, British Patent Nos. GB1517767, GB-A-2100271 and GB-A-2112793, German Patent No. DE-OS-2455896, Canadian Patent No. CA-A-2007097, U.S. Pat. Nos. 3,979,346; 4,028,313; 4,221,685; 4,233,194; 4,321,170; 4,331,573; 4,446,258; 4,538,000 and European Patent No. EP-A-0355892.

SUMMARY OF THE INVENTION

A particular type of stabilization has now been found which allows the production of resins that can function not only as the primary binder resin (self-emulsifying resin) in aqueous coating compositions, but also as reactive emulsifiers for other generally lipophilic, crosslinkable resins.

In accordance with the present invention, there is provided an aqueous coating composition comprising (i) a resin component including a functional group-containing crosslinkable resin and, (ii) optionally, a curing/crosslinking agent for functional groups of the crosslinkable resin, wherein the resin component comprises at least a resin of the general formula (I):

$$(X)_m—(LPB)—(Y)_n \quad (I)$$

wherein

LPB designates a generally lipophilic backbone;

X designates a functional group for crosslinking,

Y designates a hydrophilic stabilizing group pendant from LPB, m is $\geq 1$ and n is a number at least sufficient to render (I) water dilutable, wherein Y designates a hydrophilic stabilizing group of the general formula (II):

$$-O-\overset{O}{\underset{\|}{C}}-NH-(R)\diagup^{Z_{1q}}_{\diagdown Z_{2r}}, \quad (II)$$

in which

R designates the residue of a more than difunctional isocyanate after abstraction of the isocyanate groups, $Z_1$ designates a group of the general formula (III):

$$-NH-\overset{O}{\underset{\|}{C}}-A-(R^1)-(COOH)_p, \quad (III)$$

wherein

A designates the residue of an active hydrogen containing functional group selected from hydroxyl, mercapto, primary amino and secondary amino, after abstraction of an active hydrogen, R1 designates the residue of an H—A and carboxyl functional compound after abstraction of the H—A and carboxyl groups, $p \geq 1$, $q \geq 1$, and Z designates a group of the general formula (IV):

$$-NH-\overset{O}{\underset{\|}{C}}-A1-R^2, \quad (IV)$$

wherein

A1 designates a group selected from an O atom and a group N—R3;

R2 designates a polyoxyalkylene monoether group of the general formula (V):

$[(CH_2-CHR4-O)_b/(CH_2-CH_2-O)_a]-R5$ (V), wherein

R3 designates a group or atom selected from (i) a $C_1$ to $C_{24}$ alkyl group, (ii) the residue of an organic group having 1–24 carbon atoms and a functional group reactive with an amino group, (iii) a polyoxyalkylene monoether group of the general formula (V) and (iv) an H atom, R4 designates a $C_1$ to $C_4$ alkyl group, R5 designates a $C_1$ to $C_{24}$ organic group, a is 7–75, b is 0–25, $7 \leq a+b \leq 75$, n is a number at least sufficient to render (I) water-dilutable upon at least partial neutralization of the carboxyl groups of (III), the product n·q·p is a number sufficient to result in 0.65 meq carboxyl groups per gram of the resin component (preferably in the range of from 0.1 to 0.65), the product n·r·a is a number sufficient to result in an ethylene oxide content of 0.5–10 wt % based upon the weight of the resin component (preferably in the range of from 1.0–10, more preferably 1.5 to 6), and $3 \leq [(15 \cdot \text{meq carboxyl groups per gram of the resin component}) + (\text{wt \% ethylene oxide content})] \leq 15$ (preferably in the range of 4 to 12, more preferably in the range of 4 to 10 and especially 4 to 9); and wherein at least a sufficient proportion of the carboxyl groups of (III) have been neutralized in order to render (I) water dilutable.

The resin component of the aqueous coating composition, in addition to the resin of the general formula (I), may also comprise other resins comprising functionality capable of crosslinking under the same conditions as the reactive functionality of resin (I). When resin (I) is utilized primarily in the capacity as a self-emulsifying resin, the resin component of the coating composition generally comprises greater than 50 wt % (solids) of resin (I) and optionally, minor amounts of other water-dilutable resins as well as non-water-dilutable (lipophilic) resins. Resin (I), however, may also effectively be utilized as a reactive emulsifier for a wide variety of generally lipophilic resins, in which case the resin component generally comprises 5–50 wt % (solids) of resin (I) based upon the total weight of the resin component.

The use of resin (I) in accordance with the present invention alleviates many of the problems associated with self-emulsifying resins because the present option allows a more optimum distribution and number of hydrophilic groups. In addition, many of the problems associated with the use of higher and lower molecular weight emulsifying agents are alleviated because resin (I) is bound into the final crosslinked polymer network.

These and other features and advantages of the present invention will be more readily understood by those skilled in the art from a reading of the following detailed description, the examples and the appended claims.

DETAILED DESCRIPTION OF THE INVENTION

As mentioned above, the aqueous coating compositions in accordance with the present invention comprise at least a functional group-containing crosslinkable resin of the general formula (I) and, optionally, a curing/crosslinking agent for the functional groups of resin (I).

LPB in formula (I) stands for a generally lipophilic polymer backbone. By "generally lipophilic" is it meant that the backbone polymer is substantially non-dilutable in water. The polymer, however, may contain or be based upon components which, in and of themselves, are water-dilutable as long as the polymer itself substantially is not. Further, the term "polymer" as utilized herein is intended to include oligomers unless otherwise stated.

In general, the lipophilic backbones should possess a number average molecular weight (Mn) in the range of 300 to 100,000, more preferably 1000 to 50,000, and especially 1000 to 12,000.

According to the present invention, the generally lipophilic polymer backbones may be based upon any number of the well-known variety of polymer systems commonly utilized in coatings applications, including for example, polyesters and alkyds, polyepoxyesters, polyethers, polyurethanes, cellulose-based polymers, polycarbonates, polyacrylates and polyvinyls, polyamides, polyacetals, etc.

Preferably, the lipophilic backbones are based upon polymers containing essentially ester and/or addition polymer linkages such as, for example, polyesters (including alkyds), polyepoxyesters and polymers produced via free-radical addition polymerization. These preferred polymers may also contain minor amounts of other types of linkages such as, for example, urethane (e.g., from chain extension of a polyol with a diisocyanate), ether (e.g., chain extension of a polyol with a diepoxide) and others well-known to those skilled in the relevant art.

Further, the generally lipophilic polymer backbones must comprise at least one hydroxyl group for attachment of the hydrophilic stabilizing group(s), which is discussed in further detail below.

The compositions of a number of suitable generally lipophilic polymer backbones are also discussed in further detail below.

Also according to the present invention, the generally lipophilic polymer backbones have separately pendant therefrom:

(i) at least one ($m \geq 1$) and preferably at least two ($m \geq 2$) functional groups (X in formula (I)) capable of participating in the crosslinking reaction, and (ii) an at least sufficient number of hydrophilic stabilizing groups (Y in formula (I)) to render the generally lipophilic backbones water-dilutable upon at least partial neutralization of the carboxyl groups thereof.

"Crosslinking" is a concept well-known to those skilled in the art. Crosslinking, of course, refers to chemical drying as opposed to mere solvent evaporation, although both can play significant roles in ultimate film formation. Crosslinking functionality in coatings is varied and again generally known to those skilled in the art.

Specific suitable examples of crosslinking functionality include the following:

(i) activated unsaturated groups such as (meth)acryloyl groups, maleimides (see, e.g., EP-A-0357110) and other groups derived from maleic acid and anhydride, fumaric acid, and itaconic acid and anhydride;

(ii) other forms of ethylenic unsaturation, especially that capable of autoxidation such as allyloxy groups and groups derived from drying and semi-drying oils and acid derivatives thereof;

(iii) conjugated ethylenic unsaturation other than that derived from drying oils, for example, that derived from furfuryl compounds or sorbic acid (see, e.g., EP-A-0357110 and U.S. Pat. No. 4,070,259);

(iv) activated methylene groups such as acetoacetate and malonate groups;

(v) epoxy groups;

(vi) hydroxyl groups;

(vii) aromatic activated aldehyde groups (see, e.g., U.S. Pat. No. 5,071,481);

(viii) cyclic carbonate groups (see, e.g., JP-A-01146968 and JP-A-02053880);

(ix) azlactone groups (see, e.g., Katritzky et al, "Further Polymers Derived from Bisazlactones and Tetraamino Compounds," *Journal of Polymer Science: Part A: Polymer Chemistry*, Vol. 27, 1515–24 (1989), and K. J. Abbey, "Novel Storage Stable, Low Temperature Curable Coating Compositions," *ACS Pol. Mat. Sci. Eng.*, Vol. 63, 936–40 (1990);

(x) oxalate ester groups (see, e.g., U.S. Pat. No. 4,414,250 and DE-A-4036984);

(xi) oxazoline and oxazolidine groups (see, e.g., U.S. Pat. No. 4,373,008); and (xii) hydroxyl and alkylol amide groups.

All of the above-mentioned disclosures are incorporated by reference herein for all purposes as if fully set forth.

Especially preferred of the above are the activated unsaturated groups, other autoxidizable ethylenically unsaturated groups, activated methylene groups, epoxy groups and hydroxyl groups, which are discussed in detail below.

Examples of suitable generally lipophilic polymers containing one or more, and preferably on average at least two, activated unsaturated groups include those disclosed in U.S. Pat. No. 4,303,563 (column 5, line 42 through column 7, line 30), U.S. Pat. No. 4,373,008 (column 2, line 54 through column 4, line 47), U.S. Pat. No. 4,382,102 (column 2, line 12 through column 3, line 4), U.S. Pat. No. 4,408,018 (column 2, lines 19–68), U.S. Pat. No. 4,590,101 (column 3, line 29 through column 4, line 12), U.S. Pat. No. 4,602,061 (column 3, lines 14–55), U.S. Pat. No. 4,871,822 (column 3, line 10 through column 4, line 14), U.S. Pat. No. 4,981,944 (column 2, line 23 through column 5, line 36), U.S. Pat. No. 4,990,577 (column 1, line 44 through column 3, line 39), U.S. Pat. No. 5,021,544 (column 2, line 19 through column 6, line 33), EP-A-0262720 (column 1, line 44 through column 4, line 31), EP-A-0355892 (page 3, line 47 through page 6, line 17) and EP-A-0401898 (page 2, line 49 through page 5, line 24). All of the above are incorporated by reference herein for all purposes as if fully set forth.

As the preferred pendant activated unsaturated groups for the polymer may be mentioned groups of the general formulas (VI), (VII), (VIII) and/or (IX):

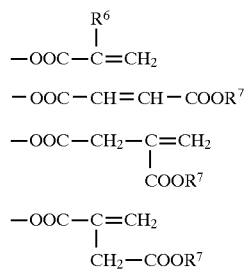

wherein $R^6$ is selected from an H atom and a methyl group, $R^7$ is selected from an H atom, a group R8, a group of the formula (X) and a group of the formula (XI):

—CH(OH)—CH$_2$—CH$_2$R$^9$      (X)

—CH$_2$—CH(OH)—CH$_2$R$^9$      (XI), $R^8$ is selected from an alkyl group, a cycloalkyl group and an aryl group, which groups may be substituted or not with an alkyl, and $R^9$ is selected from an H atom, a group $R^8$, a group of the formula (XII) and a group of the formula (XIII):

—OR$^8$      (XII)

—OOC—R$^8$      (XIII).

Examples of suitable polymers containing pendant activated unsaturated groups of the formula (VI) include those disclosed in previously incorporated U.S. Pat. Nos. 4,382, 102, 4,602,061 and 4,990,577, EP-A-0262720, EP-A-0355892 and EP-A-0401898. In general, these polymers may be referred to as acryloyl and methacryloyl group-containing polymers.

Preferred examples include (i) the acrylic and/or methacrylic esters of di-, tri- and polyvalent polyols such as polyester, polyacrylic and polyepoxyester polyols; (ii) adducts of an hydroxyl group-containing acrylic and/or methacrylic ester or amide to a compound containing at least two isocyanate and/or epoxy groups; and (iii) adducts of acrylic and/or methacrylic acid to a compound containing at least two epoxy groups. Especially preferred among these are the adducts of acrylic and/or methacrylic acid to the epoxy group-containing compounds. Further details may be found from the previously mentioned references.

Specific examples of suitable polymers containing pendant activated unsaturated groups of the formulas (VI), (VII) and (VIII) include those disclosed in previously incorporated U.S. Pat. No. 4,981,944 and EP-A-0401898. In general, these pendant activated unsaturated groups are derived from maleic acid and anhydride, fumaric acid, and itaconic acid and anhydride.

Preferred examples include (i) adducts of maleic acid (anhydride) and/or itaconic acid (anhydride) to an OH group-containing polymer, with subsequent reaction (e.g., esterification or neutralization) of at least a portion of remaining carboxyl functionality; (ii) adducts of maleic, fumaric and/or itaconic monoesters to compounds containing at least two epoxy groups; and (iii) adducts of monofunctional epoxy compounds to maleic, fumaric and/or itaconic mono-esters, which are subsequently reacted with compounds containing at least two isocyanate groups. Especially preferred among these are the adducts of the maleic and/or itaconic acid (anhydride) to the OH group-containing polymers. Further details again may be found in the previously mentioned references.

In general aspects, it is preferred that the activated unsaturated group-containing polymers possess a number average molecular weight (Mn) in the range of from about 800 to about 100,000, more preferably in the range of from about 800 to about 15,000, and a C═C equivalent weight in the range of from about 400 to about 3000, more preferably from about 500 to about 1500.

Examples of suitable generally lipophilic autoxidizable polymers include drying oil-modified polyesters (also often referred to as alkyds), polyepoxyesters and addition polymers. These polymers are in general well-known in the art, as exemplified by U.S. Pat. No. 2,634,245 (column 2, line 54 through column 3, line 45), U.S. Pat. No. 3,379,548 (column 1, line 49 through column 2, line 53), U.S. Pat. No. 3,979,346 (column 5, lines 40–47 and Table I), U.S. Pat. No. 4,131,579 (column 1, line 65 through column 4, line 56), U.S. Pat. No. 4,321,170 (column 2, line 28 through column 5, line 30) and U.S. Pat. No. 4,505,986 (column 1, line 52 through column 5, line 10).

In addition, certain allyl group-containing polymers are also considered suitable, such as those disclosed in EP-A-0234641 (page 2, line 17 through page 3, line 50) and W084/00169 (page 4, line 11 through page 5, line 6).

Preferred among these are the alkyds which, as is well-known to those skilled in the art, are generally defined as the reaction products (polyesters) of di- and polyhydric alcohols with di- and polybasic carboxylic acids and anhydrides thereof, modified by the reaction with unsaturated fatty acids and glycerides thereof (fatty oils).

Suitable di- and polyhydric alcohols include ethylene glycol, 1,2- and 1,3-propylene glycol, 1,4- and 2,3-butylene glycol, 1,6-hexanediol, 1,8-octanediol, neopentyl glycol, 1,4-dimethylol-cyclohexane, 2-methyl-1,3-propanediol, glycerol, trimethylolpropane, 1,2,6-hexanetriol, 1,2,4-butanetriol, trimethylolethane, pentaerythritol, quintol, mannitol and sorbitol, methyl glycoside, di- and higher ethylene glycols, and di- and higher butylene glycols.

Suitable di- and polybasic carboxylic acids include succinic acid, adipic acid, suberic acid, azelaic acid, sebacic acid, phthalic acid, isophthalic acid, trimellitic acid, tetrahydrophthalic acid, hexahydrophthalic acid, glutaric acid, maleic acid, fumaric acid, itaconic acid, citric acid, terephthalic acid, naphthalene-2,6-dicarboxylic acid, dodecane dicarboxylic acid, and dimer and trimer fatty acids, as well as the anhydride derivatives thereof.

Suitable unsaturated fatty acids include myristoleic acid, palmitoleic acid, oleic acid, gadoleic acid, erucic acid, ricinoleic acid, linoleic acid, linolenic acid, eleostearic acid, licanic acid, arachidonic acid, clupanodonic acid and other unsaturated fatty acids prepared from animal and vegetable oils, as well as mixtures and fatty oil derivatives thereof. Often utilized in the production of alkyds are natural oils such as, for example, linseed oil, soya oil, castor oil, tall oil and tall oil fatty acid, coconut oil, palm kernel oil, fish oils and safflower oil.

For air-drying applications (autoxidation), it is preferred to utilize medium oil (40–60% oil length) and long oil (>60% oil length) alkyds.

In other aspects, it is preferred that the autoxidizable polymers possess a number average molecular weight (Mn) in the range of from about 700 to about 100,000, more preferably in the range of from about 1000 to about 10,000.

Examples of generally lipophilic polymers containing one or more, and preferably on average at least two, pendant activated methylene groups include those disclosed in U.S. Pat. No. 4,408,018 (column 1, line 51 through column 2, line 6), U.S. Pat. No. 4,602,061 (column 1, line 50 through column 3, line 13), U.S. Pat. No. 4,772,680 (column 1, line 23 through column 2, line 54), U.S. Pat. No. 4,871,822 (column 4, line 34 through column 5, line 9) and U.S. Patent No. 4,929,661 (column 1, line 32 through column 2, line 69). All of the above not already so incorporated are incorporated by reference herein for all purposes as if fully set forth.

Specific examples of lipophilic polymers include compounds obtained by reacting diketene or an alkyl acetoacetate with a polyol having two or more hydroxyl groups, for example, polyester polyols such as polycaprolactone polyols, epoxy resins obtained by reacting epichlorohydrin with a diaryloyl alkane, and acrylic polyols obtained by the addition (co)polymerization of hydroxyl group-containing (meth)acrylic monomers, optionally with other addition polymerizable monomers. Such acetoacetate group-containing oligomers/polymers can also be obtained by (co)polymerizing monomer units having one or more acetoacetate groups, for example, the acetoacetate esters of hydroxyalkyl (meth)acrylate or allyl alcohol monomer units. Further details may be found in the previously mentioned references.

Preferred among the acetoacetate group-containing polymers are the polyesters and acrylic polymers produced by (co)polymerizing monomers containing acetoacetate groups, and particularly acrylic (co)polymers obtained by (co)polymerizing acetoacetate esters of hydroxyalkyl (meth)acrylates, optionally with other addition polymerizable monomers.

In general aspects, it is preferred that the acetoacetate group-containing polymers possess a number average molecular weight (Mn) in the range of from about 700 to about 100,000, more preferably in the range of from about 1000 to about 10,000, and an acetoacetate equivalent weight of about 200 to about 3000, more preferably from about 400 to 1500.

Examples of generally lipophilic polymers containing epoxy groups, and preferably on average at least two epoxy groups, include those disclosed in U.S. Pat. No. 3,945,964 (column 1, lines 13–54), U.S. Pat. No. 4,318,832 (column 2, line 39 through column 3, line 24), U.S. Pat. No. 4,352,898 (column 6, line 42 through column 7, line 17), U.S. Pat. No. 4,598,108 (column 1, line 39 through column 2, line 30), U.S. Pat. No. 4,737,530 (column 1, line 46 through column 2, line 37) and U.S. Pat. No. 4,990,577 (column 2, line 57 through column 3, line 23). All of the above not already so incorporated are incorporated by reference herein for all purposes as if fully set forth.

Specific examples of such polymers, which may be solid or liquid, include polyepoxyesters based upon mono-, di- or polyglycidyl ethers of (cyclo)aliphatic or aromatic hydroxyl compounds such as allyl alcohol, butanol, cyclohexanol, phenol, butylphenol, decanol, ethylene glycol, glycerol, cyclohexanediol, mononuclear di- or trifunctional phenols, bisphenols such as Bisphenol-A or Bisphenol-F, and multinuclear phenols; polymers of ethylenically compounds with epoxy groups such as glycidyl (meth)acrylate, N-glycidyl (meth)acrylamide and/or allyl glycidyl ether, and optionally one or more other copolymerizable, ethylenically unsaturated monomers; glycidyl esters of fatty acids containing, for instance, 6 to 24 carbon atoms; an epoxidized polyalkadiene such as epoxidized polybutadiene; hydantoin epoxy resins; and other glycidyl groups-containing resins such as polyesters which contain one or more glycidyl groups per molecule.

Preferred species of these include polyepoxyesters of cycloaliphatic epoxy compounds and addition polymers of ethylenically unsaturated compounds containing epoxy groups, such as glycidyl (meth)acrylate and/or allyl glycidyl ether, and optionally one or more other addition polymerizable monomers. Especially preferred are the addition polymers.

In general aspects, it is preferred that the epoxy group-containing polymers possess a number average molecular weight (Mn) in the range of from about 700 to about 100,000, more preferably in the range of from about 1000 to about 20,000, and an epoxy equivalent weight of about 200 to about 3000, more preferably from about 400 to 1500.

Examples of suitable generally lipophilic polymers containing hydroxyl groups include the variety of polyols discussed above and in the other previously incorporated references which are utilized in preparing the various other functionalized backbones, as well as those described in U.S. Pat. No. 4,028,313 (see column 2, line 19 through column 4, line 17).

In general aspects, it is preferred that the OH group-containing polymers possess a number average molecular weight (Mn) in the range of from about 1000 to about 100,000, more preferably in the range of from about 1000 to about 20,000, and an OH value of about 50 to about 280, more preferably about 80 to about 200.

Of course, the generally lipophilic polymer backbones may comprises various combinations of these different functionalities. This is evident from the above discussion as well as the previously incorporated references.

For example, the present invention is particularly applicable to short oil alkyds (oil length <40%), which are commonly used in stoving, baking and heat-curing applications in combination with crosslinking agents such as melamines and isocyanates.

In addition to the at least one pendant functional group, the present invention also requires that the generally lipophilic polymeric back-bones separately possess a sufficient number of pendant hydrophilic groups of the formula (II) in order to render the resin (I) water-dilutable.

As is clear from the formula (II), this pendant hydrophilic stabilizing group is based upon the reaction product of a more than difunctional isocyanate with a less than equivalent amount of (a) a carboxyl group-containing compound of the general formula (XIV):

$$HA-(R^1)-(COOH)_p \quad\quad (XIV),$$

wherein A, $R^1$ and p are broadly defined as above; and (b) a non-ionic group-containing compound of the general formula (XV):

$$HA^1-R^2 \quad\quad (XV),$$

wherein $A^1$ and $R^2$ are broadly defined as above. Stabilization of the resin (I), therefore, is anionic/non-ionic in nature.

In general, resin (I) is produced by reacting
(i) the backbone, which contains at least one hydroxyl group for reaction with an isocyanate group, and which may or may not be functionalized with the functional groups for crosslinking,
(ii) a more than difunctional isocyanate,
(iii) a compound of the formula (XIV) and
(iv) a compound of the formula (XV), whereby sufficient (XIV) is utilized to result in 0.65 meq carboxyl groups per gram of the resin component (preferably in the range of 0.1 to 0.65); sufficient (XV) is utilized to result in an ethylene oxide content of 0.5–10 wt % based upon the weight of the resin component (preferably in the range of from 1–10, more preferably 1.5 to 6); 3≦[ (15·meq carboxyl groups per gram of the resin component)+(wt % ethylene oxide content)]≦12 (more preferably in the range of 4 to 10 and especially 4 to 9); and the backbone contains sufficient hydroxyl groups and at least sufficient isocyanate, (XIV) and (XV) are utilized to render (I) water-dilutable upon at least partial neutralization of the carboxyl groups.

More specifically as to the formation of the hydrophilic stabilizing groups, it is preferred that one mole of the more than difunctional isocyanate is reacted with x-1 moles total of the compounds (XIV) and (XV), wherein x is the number of isocyanate groups per molecule. In this manner, one free isocyanate per stabilizing group theoretically remains for reaction with a hydroxyl group from the backbone. The term "more than difunctional isocyanate" means the average number of isocyanate functionalities is more than two. Since a mixture of isocyanate functionality numbers is frequently involved (e.g., a mixture of di-, tri-, tetra-, etc. functional isocyanates), the isocyanate functionality is not necessarily a whole number.

Various specific reaction schemes for bringing these components together can be envisioned. For example, the isocyanate compound can be reacted with the compounds (XIV) and (XV), then this reaction product subsequently reacted with the backbone. Another alternative is to conduct these reactions with a hydroxyl group-containing monomer, then polymerizing this monomer with the other constituents required to produce the desired backbone. Reaction conditions in all cases are conventional and generally well-known to those skilled in the art.

As indicated above, the isocyanate must be more than difunctional. Suitable at least trifunctional isocyanates include a wide variety of monomeric and oligomeric polyfunctional isocyanates. As specific examples may be mentioned the biuret adduct of 3 molecules of a diisocyanate with 1 molecule of water, the adduct of an at least trifunctional polyol with 1 molecule of a diisocyanate per hydroxyl equivalent, isocyanurate group-containing compounds, and compounds such as 1,3,5-triisocyanatobenzene and 2,4,6-triisocyanatoluene. As specific preferred examples may be mentioned the adduct of 3 molecules of hexamethylene diisocyanate with one molecule water (such as commercially available under the trade designation Desmodur N of Bayer and Tolonate HDB of Rhone-Poulenc); the adduct of 1 molecule of trimethylolpropane with 3 molecules of toluene diisocyanate (such as commercially available under the trade designation Desmodur L of Bayer), the adduct of 1 molecule of trimethylolpropane with 3 molecules of isophorone diisocyanate, the adduct of one molecule of trimethylolpropane with three molecules of tetramethylxylol diisocyanate (commercially available under the trade designation Cythane 3160 of Cyanamid), the adduct of 1 molecule of pentaerythritol with 4 molecules of toluene diisocyanate, and the isocyanurate trimer of various diisocyanates such as hexamethylene diisocyanate (such as commercially available under the trade designations Desmodur N3390 of Bayer and Tolonate HDT-LV of Rhone Poulenc) and isophorone diisocyanate (commercially available under the trade designation Vestanate T1890 of Huls). Other tri- and higher functional isocyanates are well-known in the art and may be employed in the current invention. For example, additional suitable isocyanates may be found in EP-A-358979, incorporated herein by reference.

A more than difunctional isocyanate mixture useful in the current invention may contain diisocyanates. As suitable diisocyanates may be mentioned those disclosed in many of the previously incorporated references, for example, 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethylhexamethylene diisocyanate, 2,4,4-trimethylhexamethylene diisocyanate, dodecamethylene diisocyanate, ω,ω'-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, transvinylidene diisocyanate, dicyclohexylmethane-4,4'-diisocyanate, 3,3'-dimethyldicyclohexylmethane-4,4'-diisocyanate, a toluene diisocyanate, 1,3-bis(isocyanatomethyl)benzene, a xylene diisocyanate, 1,5-dimethyl-2,4-bis(isocyanatomethyl) benzene, 1,5-dimethyl-2,4-bis(2-isocyanatoethyl)benzene, 1,3,5-triethyl-2,4-bis(isocyanatomethyl)benzene, 4,4-diisocyanatodiphenyl, 3,3'-dichloro-4,4'-diisocyanatodiphenyl, 3,3'-diphenyl-4,4'-diisocyanatodiphenyl, 3,3'-dimethoxy-4,41-diisocyanatodiphenyl, 4,4'-diisocyanatodiphenylmethane, 3,3'-dimethyl-4,4'-diisocyanatodiphenylmethane and a diisocyanatonaphthalene.

In light of the definition of A provided above, suitable compounds of the formula (XIV) include monohydroxy, monomercapto and monoamino carboxylic acids.

Preferred monohydroxy carboxylic acids include those wherein $R^1$ is an aliphatic hydrocarbon group having from 4 to 24 carbon atoms. Specific examples include hydroxypivalic acid, salicylic acid, hydroxycaproic acid, 2-hydroxyisocaproic acid, 12-hydroxystearic acid, 12-hydroxyoctadonanoic acid, 16-hydroxyhexadecanoic acid, 12-hydroxyoctadecanoic acid, lactic acid, malic acid, 3-hydroxybutyric acid, 4-hydroxybutyric acid, 2-ethyl-2-hydroxybutyric acid, 1,3-diamino-2-hydroxypropane-N,N,N'N'N-tetraacetic acid, N-(2-hydroxyethyl)-ethylenediamine-triacetic acid and N-(2-hydroxyethyl)-iminodiacetic acid. Of these, hydroxypivalic acid and 12-hydroxystearic acid are preferred.

Preferred monomercapto carboxylic acids include those wherein $R^1$ is an aliphatic hydrocarbon group having from 1 to 8 carbon atoms. Specific examples include mercaptoacetic acid, 3-mercaptopropionic acid and mercaptosuccinic acid, and N-substituted derivatives thereof.

Preferred monoamino carboxylic acids include those wherein $R^1$ is a hydrocarbon group having from 1 to 8 carbon atoms. Specific examples include glycine and para-amino benzoic acid.

Suitable compounds of the formula (XV) include polyoxyalkylene glycol monoalkyl ethers of the general formula (XVa):

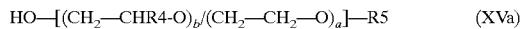

HO—[(CH$_2$—CHR4-O)$_b$/(CH$_2$—CH$_2$—O)$_a$]—R5    (XVa)

and polyoxyalkylene monoamine monoalkyl ethers of the general formula (XVb):

R3-NH—[(CH$_2$—CHR4-O)$_b$/(CH$_2$—CH$_2$—O)$_a$]—R5    (XVb), wherein $R^3$, $R^4$, $R^5$, a and b are as defined above.

Preferred polyoxyalkylene glycol monoalkyl ethers are those wherein $R^4$ is a methyl group, $R^5$ is a $C_1$ to $C_4$ alkyl group, a is 7 to 50, b is 0 to 4 and $7 \leq a+b \leq 50$. Especially preferred are methoxy polyethylene glycols with an Mn of 300 to 2000.

Preferred polyoxyalkylene monoamine monoalkyl ethers are those wherein $R^4$ is a methyl group, $R^4$ is a $C_1$ to $C_4$ alkyl group, a is 7 to 50, b is 0 to 4, $7 \leq a+b \leq 50$, and R is selected from an alkyl group having 1 to 20 carbon atoms, the residue of a monoepoxide having 1 to 20 carbon atoms, the residue of a monoacrylate having 1 to 20 carbon atoms and a polyoxyalkylene monoether group of the general formula (V). Especially preferred for R is the monoepoxide residue.

Further in accordance with the present invention, the aqueous coating compositions may optionally comprise curing/crosslinking agents for the functional groups X of the resin (I).

As utilized herein, "curing agent" refers to an agent which merely initiates and sustains a crosslinking reaction. Curing agents, such as peroxides and photoinitiators (activated by UV radiation), are normally utilized in small amounts with respect to the resin and are not substantially bound into the final crosslinked polymer structure.

"Crosslinking agents," on the other hand, are substances containing functional groups which react with the crosslinking functionality of the binder and are, as a consequence, incorporated into the final crosslinked polymer structure. Crosslinking agents are generally utilized in relatively large amounts with respect to the resin.

In addition, "catalysts" are agents which merely accelerate the crosslinking reaction. For example, the autoxidation of ethylenic unsaturation via the taking up of oxygen from the air can be accelerated by the addition of a catalyst such as a metal complex.

Crosslinking can also be initiated and sustained, for example, by various forms of energy such as heat, microwave radiation, etc.

In general, the types and choice of curing/crosslinking agents for the above-mentioned crosslinking functionalities depend upon a number of factors which are well-known to those skilled in the art, as exemplified by the many incorporated references. Some preferred examples, however, are specifically mentioned below.

Preferred crosslinking agents for activated unsaturated groups include those that react with activated unsaturated groups via a Michael addition. Such preferred Michael addition crosslinking agents include a wide variety of primary and/or secondary amine groups-containing compounds such as, for example, those disclosed in U.S. Pat. Nos. 3,291,775; 4,303,563; 4,981,944; 4,990,577 and 5,011,994. All of these disclosures not already so incorporated by reference herein as if fully set forth.

Preferred examples of such amine crosslinking agents include (i) aliphatic and/or cycloaliphatic amine compounds containing 2–24 carbon atoms and at least one primary amino group; and (ii) adducts of a molecular weight of 300–1500 of (a) an epoxy, isocyanate and/or $\alpha,\beta$-ethylenically unsaturated carbonyl compound and (b) a compound containing at least one primary amino group and a group reacting with the epoxy, isocyanate and/or $\alpha,\beta$-ethylenically unsaturated carbonyl compound. More preferably, these amine crosslinking agents contain 2 to 4 primary amino groups and 0 to 4 secondary amino groups. Especially preferred of these are, for example, polyether polyamines of the type commercially available under the trade designation "Jeffamine" of Texaco Chemical Company.

Other suitable amine crosslinking agents include monoprimary amine compounds of the general formula (XVI):

H$_2$N—(CH$_2$)$_{n1}$—NR$^{10}$R$^{11}$    (XVI)

wherein n1 is a number from 1 to 4,
$R^{10}$ is selected from an H atom, a $C_1$ to $C_3$ alkyl and a monohydroxy substituted $C_1$ to $C_3$ alkyl, and
$R^{11}$ is selected from a $C_1$ to $C_3$ alkyl and a monohydroxy substituted $C_1$ to $C_3$ alkyl, which are disclosed in EP-A-0401898 (corresponding to U.S. Pat. No. 5,112,904), the disclosure of which is also incorporated by reference herein as if fully set forth. Especially preferred of these are, for example, N-ethyl-N-(2-aminoethyl)ethylamine, N-methyl-N-(3-aminopropyl)-ethanolamine, N-methyl-N-(2-aminoethyl) methylamine and N-methyl-N-(3-aminopropyl) methylamine.

Of the amine crosslinking agents, the most preferred for use in the present aqueous coating compositions are the polyether polyamines.

Oxazolidine compounds, such as disclosed in U.S. Pat. No. 4,373,008 (the disclosure of which is incorporated by reference herein as if fully set forth), are also suitable Michael addition type crosslinking agents.

Still other suitable Michael addition type crosslinking agents may be mentioned compounds containing activated methylene groups, for example, acetoacetate and/or malonate group-containing compounds.

Suitable acetoacetate group-containing compounds include lower molecular weight acetoacetates such as trimethylolpropane triacetoacetate, as well as polymeric compounds containing pendant acetoacetate groups such as disclosed in U.S. Pat. No. 4,408,018 (the disclosure of which is incorporated by reference herein as if fully set forth).

Suitable malonate group-containing compounds include polymalonate oligomeric and polymeric esters such as disclosed in U.S. Pat. No. 4,602,061 (the disclosure of which is incorporated by reference herein as if fully set forth).

Suitable combination curing/crosslinking agents for activated unsaturated groups include, for example, allyloxy groups-containing compounds such as disclosed in U.S. Pat. No. 4,590,101, AU66/2337, EP-A-0067625 and U.S. Pat. No. 4,145,248, the disclosures of which are all incorporated by reference herein as if fully set forth.

Preferred among these free radical reactive curing/crosslinking agents are those comprising an oligomeric and/or polymeric backbone including a plurality of mer units containing pendant allyloxy groups, such as those of the general formula (XVII):

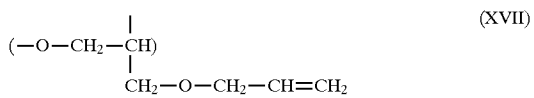

(XVII)

An especially preferred reactive crosslinker is commercially available under the trade designation Santolink XI-100 from Monsanto Chemical Company.

Chemical curing agents for activated unsaturated groups include free-radical initiators such as peroxides and hydroperoxides. These compounds are in general well-known to those skilled in the art and need no specific elucidation. As specific preferred examples, however, may be mentioned cumene hydroperoxide and methyl ethyl ketone peroxide.

Of course, as indicated above, activated unsaturated groups may be cured with the aid of UV radiation in combination with a photoinitiator. See, for example, U.S. Pat. No. 4,382,102, the disclosure of which is incorporated by reference herein as if fully set forth.

Depending upon the type of coating composition and desired application, various other conventional catalyst-related additives may also be utilized. For example, if an autoxidatively drying coating is desired, any number of well-known driers may be added to the coating composition. As examples may be mentioned metal siccatives such as manganese octoate and cobalt octoate. The use of these other additives is well-known to those skilled in the art, and need not be elucidated further.

Suitable siccatives for use with the autoxidizable resins include, for example, metal salts of (cyclo)aliphatic acids such as octanoic, linoleic and naphthenic acid, or water-soluble metal salts or metal complexes, for instance metal halides or metal acetyl-acetonates, the applicable metals being lithium, barium, cobalt, manganese, lead, zirconium, calcium, zinc and rare earth metals. Preferred of these are the salts of cobalt, zirconium and calcium.

Suitable crosslinking agents for use with activated methylene group-containing resins include, for example, the same amine group-containing crosslinking agents as suitable for use with the activated unsaturated group-containing resins.

Other suitable crosslinking agents include those that react via a Michael addition type reaction, that is, activated unsaturated group-containing compounds such as discussed above and mentioned in the previously incorporated references.

Still further, isocyanates and melamines normally used for crosslinking hydroxyl group-containing polymers have been found to be suitable for crosslinking activated methylene group-containing resins. These isocyanate and melamine crosslinkers are generally well-known in the art, and are discussed in more detail below.

Suitable curing/crosslinking agents for use with the epoxy group-containing resins are again well-known to those skilled in the art and include, most preferably, the aforementioned amines.

Suitable hydroxyl group crosslinking agents include be mentioned N-methylol and/or N-methylol ether containing aminoplasts. Especially favorable results can be obtained by using a methylol melamine having 4–6 methylol groups per molecule, with at least three of the methylol groups being etherified with methanol, butanol and/or a methanol/butanol condensation product of formaldehyde and N,N$^1$-ethylene diurea.

Other suitable hydroxyl group crosslinking agents include a variety of blocked and non-blocked isocyanates such as disclosed in previously incorporated U.S. Pat. No. 4,028,313. As specific examples may be mentioned water-dispersible blocked isocyanates, such as those blocked with methylethylketoxime, and isocyanate group-containing adducts of a polyisocyanate and a hydroxycarboxylic acid, for instance, dimethyol propionic acid.

The particular choices of curing/crosslinking agent and amount utilized, of course, can vary widely depending on a number of factors including, but not limited to, the particular binder, coating system, application method, substrate and ultimate use. As indicated before, these and other factors will be appreciated by one skilled in the art, who can choose the proper type and amount of curing agent accordingly.

For example, the amine crosslinking agents are preferably utilized in amounts such that the number of equivalents of functional groups in the resin component to the number of equivalents of amine hydrogen is in the range of from about 1.5 to about 2.5, more preferably in the range of from about 1.8 to about 2.2.

The oxazolidine crosslinking agents are preferably utilized in amounts such that the number of equivalents of functional groups in the resin component to the number of equivalents of potential secondary amine nitrogen is in the range of from about 0.2 to about 3.5, more preferably in the range of from about 1 to 2.

As another example with respect to activated unsaturated groups-containing binders, the malonate and acetoacetate crosslinking agents are preferably utilized in amounts such that the number of equivalents of activated unsaturated groups in the resin component to the number of equivalents of activated methylene hydrogen is in the range of from about 0.25 to about 4, preferably in the range of from about 0.5 to about 2. This same ratio applies when activated unsaturated group-containing crosslinking agents are utilized for the activated methylene group-containing resins.

The polyallyloxy group-containing curing/crosslinking agents are preferably utilized in amounts ranging from about 10 wt % to about 50 wt %, based upon the weight of the resin component.

For autoxidation, the siccatives are generally utilized in amounts ranging from about 0.001 to 3 wt % based upon the weight of the autoxidizable resin.

For UV curing, the photoinitiators are generally utilized in amounts ranging from about 0.001 to 3 wt % based upon the weight of the UV-curing resin.

The hydroxyl group crosslinking agents are generally utilized in amounts such that the ratio of the hydroxyl groups of the resin component to the reactive groups of the crosslinking agent is in the range of from about 0.7 to 1.5.

The resins (I) in accordance with the present invention are readily dispersible in an aqueous medium upon sufficient neutralization of the carboxyl groups thereof. Suitable neutralizing agents include a wide variety of organic and inorganic bases, for example, tertiary amines, amine alcohols and ammonia. The preferred degree of neutralization ranges from 50% to 130% on an equivalent basis.

The resins (I) subsequent to neutralization may be readily dispersed in the aqueous medium via conventional means. In the alternative, the resin (I) may be dispersed in an aqueous medium containing a sufficient amount of a neutralizing agent. Dispersion is usually accomplished at slightly elevated temperatures of 50° to 100° C.

In addition to the curing/crosslinking agents, the aqueous coating compositions may contain the usual additives such as, for example, pigments, fillers, levelling agents, emulsifiers, anti-foaming agents and other rheology control agents, antioxidants, UV stabilizers, antisag agents and minor amounts of co-solvents as required, the only limitation being that these additives must be compatible with the other components of the coating composition. This information is well-known and/or readily available to those skilled in the art.

If a co-solvent is utilized, it is preferred that such should be water miscible and utilized in amounts of no more than 10% by weight based upon the aqueous coating composition. As examples of suitable water-miscible co-solvents may be mentioned butyl glycol, isopropyl glycol, butyl diglycol, isopropanol, n-propanol, diacetone alcohol and the like.

The aqueous coating compositions may be formulated to various solids contents, generally ranging from about 20% to about 75%, but preferably percent in the range of from about 30% to about 55%, depending on the method of application chosen.

The aqueous coating compositions in accordance with the present invention may be applied in any known manner, such as by roller coating, spraying, brushing, sprinkling, flow coating or dipping. It is preferred that the composition should be applied by spraying.

Suitable substrates include those of metals, which may be pretreated or not, wood, synthetic materials, paper, glass or leather. Especially preferred are metals such as iron, steel and aluminum, and synthetic substrates such as polyurethanes, polyolefins and polycarbonates, as well as reinforced varieties thereof.

Curing of the coating, of course, depends upon the particular coating, application method and use. Again these factors and others will be appreciated by one skilled in the art, who can readily make the appropriate choices accordingly.

For example, coating compositions including the above-mentioned functionalities with a properly chosen crosslinking agent can suitably be cured at low or ambient temperatures of from 0° C. to 40° C., or can be baked at elevated temperatures for accelerated cure (e.g., 60° C. to 120° C.).

The hydroxyl groups and melamine/blocked isocyanate crosslinking agents, on the other hand, normally require baking conditions (e.g., 120° C. to 180° C.) for suitable curing.

An especially preferred use of the aqueous coating compositions in accordance with the present invention is in the automobile repair/refinishing industry. When so utilized, it is preferred that the system be ambient temperature curable, especially with the aid of an amine group-containing crosslinking agent. The resin component, therefore, should comprise ambient temperature amine-reactive functional groups.

Especially preferred for this use are resins containing at least two pendant activated unsaturated groups which, most preferably, are (meth)acryloyl groups. For further details, reference may be had to the previous discussion and previously incorporated references such as U.S. Pat. No. 4,990,577.

Another preferred use of the aqueous coating compositions in accordance with the present invention is as a primer for various metal substrates. When so utilized, it is again preferred that the system be ambient temperature curable, but with resins containing at least two pendant activated methylene groups. Especially preferred for this use is an acrylic-based resin containing pendant acetoacetate groups. For further details, reference may be had to the previous discussion and previously incorporated references such as U.S. Pat. No. 4,772,680.

Another preferred use of the aqueous compositions in accordance with the present invention is as a primer or topcoat for general industrial applications. When so utilized, it is preferred that the system be curable at ambient temperature by contact with air. Especially preferred for this use is an oxidatively drying, medium oil alkyd resin.

The foregoing general discussion of the present invention will be exemplified by the following examples offered by way of illustration and not limitation on the scope thereof.

EXAMPLES

Example 1

Preparation of Lipophilic Acetoacetate Functional Polyester—LPB1

A 5 liter, four-necked, round-bottom flask fitted with a stirrer, thermometer and gas inlet tube was charged under nitrogen with 1148 parts by weight (pbw) trimethylolpropane, 416 pbw adipic acid, 1308 pbw hexahydrophthalic anhydride and 1128 pbw 1,4-dimethylolcyclohexane. The contents were heated to 250° C. and maintained at that temperature until an acid value of less than 1 (mg KOH/g) was achieved. The resulting polyester product comprised 98 wt % solids and a hydroxyl value of 280 (on solids).

4387 parts by weight of the above polyester product and 2344 pbw of ethyl acetoacetate were mixed and heated to 160° C. for 3–4 hours, with the ethanol formed from the transesterification being distilled off. Upon completion of the transesterification, the mixture was cooled to 80° C. Subsequently, the reaction vessel was placed under vacuum and the volatile contents distilled off at a temperature of 150° C.

After cooling to 70° C., xylene was added in an amount to result in a solids content of 88.8 wt %. The resulting product (LPB1) possessed a hydroxyl value of 55 (on solids) and an acetoacetate equivalent weight of 332 (on solids).

First Modification of LPB1—MLPB1a

A 2 liter, four-necked, round-bottom flask fitted with a stirrer, thermometer and gas inlet tube was charged under nitrogen with 58.8 pbw methoxypropyl acetate, 30.0 pbw hydroxypivalic acid, 33.3 pbw methoxypolyethylene glycol 550 (commercially available under the trade designation Breox 550 of BP Chemicals) and 629.0 pbw of LPB1, and the mixture heated to 80° C. in order to dissolve all of the hydroxypivalic acid.

After cooling the clear mixture to 55° C., 92.8 pbw of a biuret isocyanate trimer (commercially available under the trade designation Desmodur N3200 of Bayer) was added over a period of one hour while maintaining the batch temperature below 60° C. After addition of the isocyanate, the charge was heated to 100° C. until the IR spectrum of a sample showed no residual isocyanate groups. Subsequently, the reaction vessel was placed under a vacuum and the volatile contents substantially distilled off.

After cooling, the resulting product (MLPB1a) had a solids content of 95.4%, an acid value of 20 (on solids) and an ethylene oxide content of 4.5 wt %.

Preparation of emulsion—E1a

A 250 ml, four-necked, round bottom flask fitted with a stirrer and thermometer was charged with 102.0 pbw of demineralized water and 2.9 pbw of triethylamine. Subsequently, 85.5 pbw of MLPB1 and 12.7 pbw of N-methylpyrrolidone were heated to 80° C. and slowly added to the flask over a period of 15 minutes. The resulting emulsion (E1a) had a solids content of 40.5% and a particle size of about 55 nm.

Example 1b

Second Modification of LPB1—MLPB1b

A 2 liter, four-necked, round-bottom flask fitted with a stirrer, thermometer and gas inlet tube was charged under nitrogen with 60.0 pbw methoxypropyl acetate, 7.9 pbw hydroxypivalic acid, 6.3 pbw methoxypolyethylene glycol 2000 (commercially available under the trade designation Breox 2000 of BP Chemicals) and 242.4 pbw of LPB1, and the mixture heated to 80° C. in order to dissolve all of the hydroxypivalic acid.

After cooling the clear mixture to 55° C., 20.6 pbw of a biuret isocyanate trimer (commercially available under the trade designation Desmodur N3200 of Bayer) was added over a period of one hour while maintaining the batch temperature below 60° C. After addition of the isocyanate, the charge was heated to 100° C. until the IR spectrum of a sample showed no residual isocyanate groups.

Subsequently, the reaction vessel was placed under a vacuum and the volatile contents substantially distilled off. After cooling, the resulting product (MLPB1b) had a solids content of 98.6%, an acid value of 14.4 (on solids) and an ethylene oxide content of 8.5 wt %.

Preparation of emulsion—E1b

A 250 ml, four-necked, round-bottom flask fitted with a stirrer and thermometer was charged with 207.5 pbw of demineralized water and 4.2 pbw of triethylamine. Subsequently, 155.8 pbw of MLPB2 and 14.9 pbw of methoxypropanol were heated to 80° C. and slowly added to the flask over a period of 15 minutes. The resulting emulsion (E1b) had a solids content of 39.8% and a particle size of about 160 nm.

Example 2

Preparation of Lipophilic Short Oil Alkyd—LPB2

A 5 liter, four-necked, round-bottom flask fitted with a stirrer, thermometer, gas inlet tube and reflux column was charged under nitrogen with 1409 pbw trimethylolpropane, 679 pbw isononanic acid and 1412 pbw isophthalic acid. The mixture was heated to 230° C. with the reaction water removed under xylene reflux until an acid value of 2 (mg KOH/g) (on solids) had been reached. The resulting product (LPB2) comprised 98 wt % solids and a hydroxyl value of 188 (on solids).

Preparation of Hydrophilic Stabilizing Group—SG2

A solution of 254 pbw 12-hydroxystearic acid and 191 pbw methoxypolyethylene glycol 550 (commercially available under the trade designation Breox 550 from BP Chemicals) in 500 pbw N-methylpyrrolidone was added to 305 pbw of a biuret isocyanate trimer (commercially available under the trade designation Desmodur N100 of Bayer), and the mixture reacted at a temperature of 60° C. until the NCO content (as measured by IR spectrum) had fallen to 1.95%.

Modification of LPB2—MLPB2

The solution of SG2 was then added to 2250 pbw LPB2, the mixture heated to 110° C., and the reaction allowed to proceed at 100° C. until the NCO content had fallen to below 0.01%. The resulting product (MLPB2) had a solids content of about 87%, an acid number of 14.3 (on solids), a hydroxyl number of 130 (on solids) and an ethylene oxide content of 6 wt %.

Preparation of Emulsion—E2

MLPB2 was then fully neutralized with dimethylethanolamine and dispersed in demineralized water to obtain a stable translucent emulsion (E2) with a solids content of 39.8%, a pH of 8.8 and a viscosity (20° C., Epprecht B6) of 145 cpa.s.

White Stoving Lacquer from E2

A white stoving lacquer was prepared from E2 by grinding 150 pbw E2, 195 bpw of titanium dioxide pigment (commercially available under the trade designation Kronos 2160 of Tioxide) and 1 pbw of a dispersing aid (commercially available under the trade designation Byk 181 from Byk Chemie), then further mixing into this 275 pbw of E2, 37 pbw of a methylated melamine formaldehyde resin (commercially available under the trade designation Cymel 323 of American Cyanamid) and 42 pbw demineralized water.

A 120 μm wet film of this lacquer was applied onto a glass panel and baked for 30 minutes at 120° C. The resulting film possessed a Persoz hardness of 235 sec, a 60° gloss reading of 90 GU, and excellent xylene and alcohol/water resistance.

Example 3

Preparation of Lipophilic Medium Oil Alkyd—LPB3

A 5 liter, four-necked, round-bottom flask fitted with a stirrer, thermometer, gas inlet tube and reflux column were charged under nitrogen with 1533 pbw tall oil fatty acids, 994 pbw pbw isophthalic acid, 858 pbw trimethylolpropane and 116 pbw neopentyl glycol. The mixture was heated to 230° C. with the reaction water removed azeotropically until an acid value of less than 5 (mg KOH/g) (on solids) had been reached. The resulting product (LPB3) comprised 98 wt % solids and a hydroxyl value of 75 (on solids).

Preparation of Hydrophilic Stabilizing Group—SG3

A solution of 113 pbw 12-hydroxystearic acid and 43 pbw methoxypolyethylene glycol 550 (commercially available under the trade designation Breox 550 from BP Chemicals) in 250 pbw N-methylpyrrolidone was added to 107 pbw of a biuret isocyanate trimer (commercially available under the trade designation Desmodur N100 of Bayer), and the mixture reacted at a temperature of 60° C. until the NCO content (as measured by IR spectrum) had fallen to 1.5%.

Modification of LPB3—MLPB3

The solution of SG3 was then added to 737 pbw LPB3, and the reaction allowed to proceed at 80° C. until the NCO content had fallen to below 0.01%. The resulting product (MLPB3) had a solids content of 81.5%, an acid number of 23 (on solids), a hydroxyl number of 45 (on solids) and an ethylene oxide content of 4 wt %.

Preparation of Emulsion—E3

MLPB3 was then fully neutralized with triethylamine and dispersed in demineralized water to obtain a stable translucent emulsion (E3) with a solids content of 39.7%, a pH of 8.5 and a viscosity (20° C., Epprecht B6) of 10 cpa.s.

Example 4

Preparation of Lipophilic Acetoacetate Functional Acrylic— LPB4

A monomer mixture consisting of 1560 pbw acetoacetoxyethyl methacrylate, 210 pbw hydroxyethyl methacrylate, 150 pbw butyl acrylate, 915 pbw styrene and 165 pbw octyl mercaptan was prepared. A catalyst solution consisting of 60 pbw t-butylperoxy-3,5,5-trimethyl hexanoate (commercially available under the trade designation Trigonox 42S from Akzo Chemicals) in 200 pbw butyl acetate was separately prepared.

To a 5 liter, five-necked, round-bottom flask fitted with a stirrer, thermometer, gas inlet tube, reflux columns and monomer/initiator feed inlet were charged 575 pbw butyl acetate, which was heated to reflux under a nitrogen sparge. To the reactor were then added the monomer mixture and catalyst solution over a period of three hours and one-half hour, respectively, while maintaining reflux. One-half hour after the termination of the catalyst addition a chaser catalyst solution consisting of 15 pbw t-butylperoxy-3,5,5-trimethyl hexanoate in 50 pbw butyl acetate was added over a period of fifteen minutes, and the mixture was post-polymerized for another hour. Finally, the mixture was thinned with 280 pbw butyl acetate to result in a 75% solution of an acetoacetate functional lipophilic acrylic resin (LPB4) with an hydroxyl number of 30 (on solids).

Preparation of Hydrophilic Stabilizing Group—SG4

A mixture of 158 pbw hydroxypivalic acid, 80 pbw methoxypolyethylene glycol 550 (commercially available under the trade designation Breox 550 from BP Chemicals) and 780 pbw butyl acetate was heated to 70° C. under nitrogen. To this mixture was added 582 pbw of an isocyanurate trimer (commercially available under the trade designation Vertanate T1890 from H1s), and the mixture held at a temperature of 60° C. until the NCO content (as measured by IR spectrum) had fallen to 3.0% (on solution).

Modification of LPB4—MLPB4

The solution of SG4 was then added to 3103 pbw LPB3, and the reaction allowed to proceed at 100° C. until the NCO content had fallen to below 0.1%. The butyl acetate was then stripped off under vacuum and 750 pbw N-methylpyrrolidone added to yield an 80% solution of an acetoacetate functional acrylic resin (MLPB4) having an acid value of 25 (on solids), an ethylene oxide content of 2.5 wt % (on solids) and 1.74 meq acetoacetate groups/ gram solid resin (MLPB4).

Preparation of Emulsion—E4

MLPB4 was then fully neutralized with triethylamine and warm emulsified in demineralized water to obtain an emulsion (E4) with a solids content of 40%, a pH of 8.4, an average particle size of 140 nm and a viscosity (Brookfield LVT #1) of 170 mPa.s.

Example 5

Preparation of Lipophilic Acrylic Polyol—LPB 5

A monomer mixture consisting of 897 pbw hydroxyethyl methacrylate 515 pbw butyl acrylate, 1022 pbw styrene and 128 pbw octyl mercaptane was prepared. A catalyst solution consisting of 51 pbw Trigonox 42 S and 223 pbw butyl acetate was separately prepared.

To a 5 liter, five-necked round-bottom flask fitted with a stirrer, thermometer, gas inlet tube, reflux column and monomer/initiator inlet were charged 441 pbw butyl acetate, which was heated to reflux under a nitrogen sparge.

To the reactor then were added the monomer mixture and catalyst solution over, respectively, three and three and a half hour periods while maintaining reflux.

Half an hour after the termination of the catalyst solution a chaser catalyst consisting of 13 pbw Trigonox 42 S in 47 pbw butyl acetate was added over a period of fifteen minutes and the mixture was post-polymerized for another hour.

Finally the mixture was thinned with 360 pbw butyl acetate to result in a 75% solution of an acrylic polyol with a hydroxyl number of about 150 (on solids).

Preparation of Hydrophibic Stabilizing Group—SG 5

A mixture of 84 pbw hydroxypivalic acid, 125 pbw methoxypolyethylene glycol 750 and 544 pbw butyl acetate was heated to 60° C. under nitrogen. To this mixture was added 236 pbw Desmodur N and the mixture was held at a temperature of about 60° C. until the NCO content (as measured by titration) had fallen to 1.5% (on solution).

Modification of LPB 5—MLPB 5

The solution of SG 5 was then added to 2073 pbw LPB5 and the reaction allowed to proceed at 100° C. until the NCO content had fallen to below 0.05%. 350 pbw of butyl glycol were added and the butyl acetate was stripped off under vacuum at about 100° C.

An 85% solution of an acrylic polyol with an acid value of 20 (on solids), an ethylene oxide content of 6% (on solids) and a hydroxyl value of about 105 (on solids) was obtained (MLPB 5).

Preparation of Emulsion E5

The MLPB5 was cooled to about 50° C. 52 pbw dimethylethanolamine were added in order to neutralize about 80% of the carboxylic groups on the MLB. Demineralized water was then slowly added over a period of 50 minutes. An emulsion with a solids content of 39.7%, a pH of 8.4 and an average particle size of 260 nm resulted.

Example 6

Preparation of a Lipophilic Acrylic Resins with Pendant Activated Unsaturated Groups—LPB6

A monomer/initiator mixture consisting of 907 pbw of glycidyl methacrylate, 268 pbw of hydroxyethyl acrylate, 821 pbw styrene, 367 pbw butyl acrylate, 137 pbw octryl mercaptane, 140 pbw Trigonox 42 S and 142 pbw methoxypropyl acetate was prepared.

To a 5 l round-bottom flask equipped with a stirrer, reflux condenser, nitrogen inlet and monomer/initiator dosing funnel, 875 pbw methoxypropyl acetate were charged. The cosolvent was purged with nitrogen and heated to reflux. The monomer/initiator mixture was added over a three hour period while maintaining reflux. After the addition was completed a catalyst solution consisting of 10 pbw Trigonox 42 S and 10 pbw methoxypropyl acetate was added in 10 min. The mixture was kept under reflux and after one hour a catalyst solution consisting of 18 pbw Trigonox 42 S and 87 pbw methoxypropyl acetate was added. The mixture was kept for another hour at reflux, thinned with 130 pbw methoxypropyl acetate and cooled.

A prepolymer solution of NVC 63.5% was obtained. 1500 pbw of this solution were transferred to a round-bottom vessel equipped with stirrer, reflux condenser, air inlet and dosing funnel. The contents were heated to 110° C. and air was passed through. A mixture consisting of 160 pbw acrylic acid, 2 pbw inhibitor and 1 pbw catalyst was added.

The resulting mixture was heated to 120° C. and kept at that temperature till the acid value was below 2 (on solids).

A lipophilic acrylic resin with pendant activated unsaturated groups was obtained with NVC 68.6% and acid value 1.9 (on solids) LPB6G.

Preparation of Hydrophylic Stabilizing Group—SG6

A mixture of 42 pbw hydroxypivalic acid, 64 pbw methoxypolyethylene glycol 550 and 275 pbw methoxypropyl acetate was heated to 60° C., 135 pbw of Desmodur N100 were added, and the mixture was kept at 60° C. till the NCO content fell to 2%.

Modification of LPB6—MLPB6

The hydrophylic stabilizing group SG6 was added to 1110 pbw LPB6. The mixture was heated to 80° C. and then kept at that temperature until the NCO content fell below 0.05%. Then the mixture was heated to 100° C. and part of the methoxypropyl acetate was distilled off under vacuum to obtain a solution of an acrylic resin with pendant activated unsaturated groups with NVC 77.8, acid value (on solids) 17.6, 6% ethylene oxide (on solids) and 1.48 equivalents of unsaturated groups per 1000 g solid resin.

Preparation of Emulsion—E6

338 pbw of the MLPB-6 solution were transferred to a vessel equipped with a stirrer and vacuum distillation unit. The solution was heated to 120° C. and part of the solvent was distilled off under vacuum until a solution of 82.8% solids was reached. The solution was than cooled to 90° C. and 10 pbw triethylamine were added to neutralize the carboxylic acid on the resin.

In a separate vessel was charged 352 pbw demineralized water and while stirring the neutralized resin solution was added to the water. A milky white emulsion was obtained with a solids content of 37.9% and a number average particle size of 130 nm.

Example 7

Preparation of Lipophilic Long Oil alkyd—LPB7

To a round bottom reaction vessel equipped with a stirrer, a condenser with water trap and a thermometer were charged 2105 pbw sunflower fatty acids, 635 pbw cyclohexyldicarboxylic acid, 365 pbw trimethylolpropane, and 345 pbw pentaerythritol. The contents of the vessel were heated to 230° C. and water was distilled off azeotropically until the acid value fell below 1. An air drying alkyd resin with an oil length of 63% was obtained.

Preparation of Hydrophilic Stabilizer Group—SG7

To a round-bottom reaction vessel equipped with a stirrer, a reflux condenser and a thermometer were charged 66 pbw methoxypolyethylene glycol 350, 102 pbw hydroxystearic acid and 300 pbw xylene. The contents were heated to 60° C. and 167 pbw Vestanat T1890 were added. The mixture was held at 60° C. until the NCO content reached 1.51%.

Modification of LPB7—MLPB7

To a round bottom reaction vessel equipped with a stirrer, a vacuum distillation unit and a thermometer were charged 866 pbw of the alkyd LPB7. The alkyd was heated to 100° C. Then the stabilizing group SG7 was added. The mixture was kept at 100° C. till the NCO content fell to below 0.05%, then the xylene was removed under reduced pressure at 100° C. A nearly 100% modified long oil alkyd was obtained with an acid value of 15 and 5% ethylene oxide units.

Preparation of Emulsion—E7

To a 1 l round-bottom vessel, equipped with a stirrer and a reflux condenser were charged 200 pbw of the modified alkyd MLPB7. 22 pbw butyl glycol were added followed by 4 pbw of a 25% (w/w) $NH_3$ solution in water. The mixture was kept at room temperature and homogenized for 15 min.

Under slow stirring, 53 pbw of demineralized water were metered in over a period of 40 minutes. A translucent emulsion was obtained with average particle size 50 nm, NVC 40%, pH 8.3 and viscosity 420 mpa.s.

Only a limited number of preferred embodiments of the present invention have been described above. One skilled in the art, however, will recognize numerous substitutions, modifications and alterations which can be made without departing from the spirit and scope of the invention as limited by the following claims.

We claim:

1. An aqueous coating composition comprising (i) a resin component including a functional group-containing crosslinkable resin and, (ii) optionally, a curing/crosslinking agent for functional groups of the crosslinkable resin, wherein the resin component comprises at least a resin of the general formula (I):

$$(X)_m\text{---}(LPB)\text{---}(Y)_n \qquad (I)$$

wherein

LPB designates a generally lipophilic backbone;

X designates a functional group for crosslinking,

Y designates a hydrophilic stabilizing group pendant from LPB, of the general formula (II);

$$-\text{O}-\overset{\overset{\displaystyle O}{\|}}{\text{C}}-\text{NH}-(R)\overset{\displaystyle Z_q^1}{\underset{\displaystyle Z_r^2}{<}} \qquad (II)$$

wherein

R designates the residue of a more than difunctional isocyanate after abstraction of the isocyanate groups and $Z^1$ designates a group of the general formula (III):

$$-\text{NH}-\overset{\overset{\displaystyle O}{\|}}{\text{C}}-\text{A}-(R^1)-(COOH)_p \qquad (III)$$

wherein

A designates the residue of an active hydrogen containing functional group selected from the group consisting of hydroxyl, mercapto, primary amino and secondary amino, after abstraction of an active hydrogen, $R^1$ designates the residue of an H—A and carboxyl functional compound after abstraction of the H—A and carboxyl groups, $p \geq 1$, $q \geq 1$, and wherein at least a sufficient proportion of the carboxyl groups of (III) have been neutralized in order to render (I) water dilutable, and $Z^2$ designates a group of the general formula (IV):

$$-\text{NH}-\overset{\overset{\displaystyle O}{\|}}{\text{C}}-\text{A}^1-R^2 \qquad (IV)$$

wherein $A^1$ designates a group selected from an O atom and a group N—$R^3$;

$R^2$ designates a polyoxyalkylene monoether group of the general formula (V):

$$[(CH_2\text{---}CHR^4\text{---}O)_b \text{ and or } (CH_2\text{---}CH_2\text{---}O)_a]\text{---}R^5 \qquad (V)$$

wherein $R^3$ designates a group or atom selected from the group consisting of (i) a $C_1$ to $C_{24}$ alkyl group, (ii) the residue of an organic group having 1 to 24 carbon atoms and a functional group reactive with an amino group, (iii) a polyoxyalkylene monoether group of the general formula (V), and (iv) an H atom, $R^4$ designates a $C_1$ to $C_4$ alkyl group, a is 7–75, b is 0–25, $7 \leq a+b \leq 75$, m is $\geq 1$ and n is a number at least sufficient to render (I) water-dilutable upon at least partial neutralization of the carboxyl groups of (III), the product n·q·p is a number sufficient to result in 0.65 meq or fewer carboxyl groups per gram of the resin component, the product n·r·a is a number sufficient to result in an ethylene oxide content of 0.5–10 wt % based upon the weight of the resin component, and $3 \leq 15$.

2. The aqueous coating composition according to claim 1, wherein R designates the residue of an at least trifunctional isocyanate after abstraction of the isocyanate groups.

3. The aqueous coating composition according to claim 1, wherein LPB designates a generally lipophilic backbone containing ester and/or addition polymer linkage.

4. The aqueous coating composition according to claim 1 wherein X is selected from the group consisting of an activated unsaturated group, other autoxidizable ethylenically unsaturated group, activated methylene group, epoxy group and hydroxyl group.

5. The aqueous coating composition according to claim 1, wherein A designates the residue of an hydroxyl group after abstraction of an active hydrogen, and $R^1$ is an aliphatic hydrocarbon group having 4 to 24 carbon atoms.

6. The aqueous coating composition according to claim 1, wherein the product n·q·p is a number sufficient to result in 0.1 to 0.65 meq carboxyl groups per gram of the resin component.

7. The aqueous coating composition according to claim 1, wherein the product n·r·a is a number sufficient to result in an ethylene oxide content of 1.5–10 wt % based upon the weight of the resin component.

8. The aqueous coating composition according to claim 1, wherein the resin component comprises greater than 50 wt % resin (I) wherein said wt % is based on solids.

9. The aqueous coating composition according to claim 1, wherein the resin component comprises a generally lipophilic crosslinkable resin and 5–50 wt % resin (I) wherein said wt % is based on solids weight of the generally lipophilic resin.

10. A method of producing a functional group-containing crosslinkable resin of the general formula (I):

$$(X)_m\text{---}(LPB)\text{---}(Y)_n \qquad (I)$$

wherein

LFB designates a generally lipophilic backbone,

X designates a functional group for crosslinking,

Y designates a hydrophilic stabilizing group pendant from LPB, of the general formula (II):

$$-O-\overset{O}{\overset{\|}{C}}-NH-(R)\overset{Z_q^1}{\underset{Z_r^2}{\diagup\diagdown}} \qquad (II)$$

wherein

R designates the residue of a more than difunctional isocyanate after abstraction of the isocyanate groups, $Z^1$ designates a group of the general formula (III):

$$-NH-\overset{O}{\overset{\|}{C}}-A-(R^1)-(COOH)_p \qquad (III)$$

wherein

A designates the residue of an active hydrogen containing functional group selected from the group consisting of hydroxyl, mercapto, primary amino and secondary amino, after abstraction of an active hydrogen, $R^1$ designates the residue of an H—A and carboxyl functional compound after abstraction of the H—A and carboxyl groups, $p \geq 1$, $q \geq 1$, and wherein at least a sufficient proportion of the carboxyl groups of (III) have been neutralized in order to render (I) water dilutable, and $Z^2$ designates a group of the general formula (IV):

$$-NH-\overset{O}{\overset{\|}{C}}-A^1-R^2 \qquad (IV)$$

wherein $A^1$ designates a group selected from the group consisting of an O atom and a group N—$R^3$;

$R^2$ designates a polyoxyalkylene monoether group of the general formula (V):

$$[(CH_2\text{---}CHR^4\text{---}O)_b \text{ and/or } (CH_2\text{---}CH_2\text{---}O)_a]\text{---}R^5 \qquad (V)$$

wherein $R^3$ designates a group or atom selected from the group consisting of (i) a $C_1$ to $C_{24}$ alkyl group, (ii) the residue of an organic group having 1 to 24 carbon atoms and a functional group reactive with an amino group, (iii) a polyoxyalkylene monoether group of the general formula (V), and (iv) an H atom, $R^4$ designates a $C_1$ to $C_4$ alkyl group, $R^5$ designates a $C_1$ to $C_{24}$ organic group, a is 7–75, b is 0–25, $7 \leq a+b \leq 75$, m is $\geq 1$ and n is a number at least sufficient to render (I) water dilutable upon at least partial neutralization of the carboxyl groups of (III), the product n·q·p is a number sufficient to result in 0.65 meq or fewer carboxyl groups per gram of the resin component, the product n·r·a is a number sufficient to result in an ethylene oxide content of 0.5–10 wt % based upon the weight of the resin component, and $3 \leq 15$, and wherein the more than difunctional isocyanate is reacted with a compound of the general formula (XIV) and, optionally, a compound of the general formula (XV):

$$HA-(R^1)-(COOH)_p \qquad (XIV)$$

$$HA^1-R^2 \qquad (XV)$$

and the reaction product is subsequently reacted with the LPB.

11. A resin produced by the method of claim 10.

* * * * *

UNITED STATES PATENT AND TRADEMARK OFFICE
CERTIFICATE OF CORRECTION

PATENT NO. : 5,859,135
DATED : January 12, 1999
INVENTOR(S) : Doomen, W.F.A. et al.

Page 1 of 2

It is certified that error appears in the above-identified patent and that said Letters Patent is hereby corrected as shown below:

Column 22, claim 1,
Line 13, general formula II, should read as,

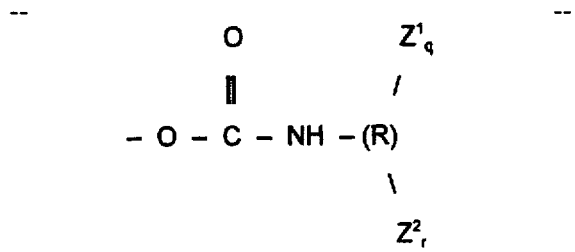

Line 51, general formula V, should read as, -- $[(CH_2 - CHR^4 - O)_b / (CH_2 - CH_2 - O)_a] - R^5$ --
Line 60, should be inserted as, -- $R_5$ designates a $C_1$ to $C_{24}$ organic group, --

Column 23 claim 1,
Line 7, should be corrected to read as, -- $3 \leq [(15$ meq carboxyl groups per gram of the resin component) + (wt% ethylene oxide content)$] \leq 15$. --

Column 23, claim 10,
Line 50, general formula II, should read as,

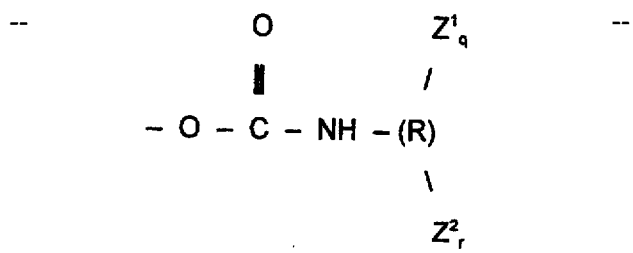

UNITED STATES PATENT AND TRADEMARK OFFICE
CERTIFICATE OF CORRECTION

PATENT NO. : 5,859,135  
DATED : January 12, 1999  
INVENTOR(S) : Doomen, W.F.A. et al.

It is certified that error appears in the above-identified patent and that said Letters Patent is hereby corrected as shown below:

Column 24, claim 10,
Line 25, general formula V, should read as,-- $[(CH_2 - CHR^4 - O)_b/ (CH_2 - CH_2 - O)_a] - R^5$ --
Line 51, should be corrected to read as, -- $3 \leq [(15$ meq carboxyl groups per gram of the resin component) + (wt% ethylene oxide content)$] \leq 15.$ --

Signed and Sealed this

Twentieth Day of November, 2001

Attest:

NICHOLAS P. GODICI  
Attesting Officer   Acting Director of the United States Patent and Trademark Office